United States Patent Office 2,913,445
Patented Nov. 17, 1959

2,913,445

CATALYST COMPOSITIONS

Delos E. Bown and Frederick W. Lampe, Baytown, Tex., assignors, by mesne assignments, to Esso Research and Engineering Company, Elizabeth, N.J., a corporation of Delaware No Drawing. Application November 5, 1956
Serial No. 620,214

9 Claims. (Cl. 260—94.9)

This invention relates to a process for the preparation of a novel type catalyst, to the catalyst composition and to methods for utilizing the catalyst composition.

In accordance with the present invention, a catalyst composition useful for a variety of purposes, such as for the polymerization of olefins, is prepared by reacting a $C_1$ to $C_4$ aliphatic azo compound in organic solvent solution with a reducible solvent soluble compound of tetravalent titanium to form a reaction mixture comprising the organic solvent having slurried therein a solvent insoluble reaction product of the titanium compound with the azo compound.

The reaction mixture may be utilized directly as a medium in which catalytic reactions such as catalytic olefin reactions may be conducted. Alternately, the insoluble reaction product may be recovered from the reaction mixture. Subsequently, the recovered product may be added to the same or a different organic solvent to prepare a reaction medium to be used in conducting catalytic chemical reactions.

The azo compounds to be utilized in accordance with the present invention are $C_1$ to $C_4$ aliphatic azo compounds such as azomethane, azoethane, azopropane, azo-isopropane, azobutane, etc. and mixtures thereof.

The titanium compounds to be reacted with the azo compound in accordance with the present invention are reducible solvent soluble compounds of tetravalent titanium, as exemplified by titanium tetrahalides such as titanium tetrachloride and titanium tetrabromide, titanium acetylacetonate, etc. and mixtures thereof.

The reaction between the titanium compound and the azo compound is conducted while such compounds are in solution in a suitable organic solvent as exemplified by aliphatic hydrocarbons such as hexane, heptane, octane, nonane, decane, dodecane, tetradecane, cetane, etc. and mixtures thereof.

The reaction mixture should consist essentially of the titanium compound, the azo compound and solvent, and should be conducted in an inert atmosphere in the absence of compounds reactable with the starting materials or the reaction products such as water, oxygen, carbon dioxide, carbon monoxide, olefinic compounds, acetylenic compounds, etc.

In general, from about 0.5 to 2 mols of azo compound should be employed per mol of titanium compound. It is preferable to employ about 1 mol of azo compound per mol of titanium compound. In general, the reaction may be conducted in the presence of about 100 to 600 volumes of solvent per volume of titanium compound, from about 300 to 500 volumes of solvent per volume of titanium compound preferably being employed.

The reaction may be conducted over a wide range of temperatures with satisfactory results. In general, it is preferable to employ temperatures of about $-10°$ C. or less (e.g., a temperature from about $-10°$ C. to about $-80°$ C.) in that the solvent insoluble reaction product formed at such low temperatures initially forms as a finely divided crystalline precipitate. At temperatures above about $-10°$ C. the solvent insoluble reaction product forms as an amorphous gum which slowly crystallizes on standing to form a crystalline precipitate.

The catalytically active composition of the present invention comprises a slurry of the crystalline precipitate formed by reaction of the titanium compound with the azo compound either by direct low temperature reaction at $-10°$ C. or less or by crystallization from an amorphous condition on standing (in case of a high temperature reaction conducted at more than about $-10°$ C.). Thus, the catalyst composition may consist of the reaction mixture resulting from the reaction of the titanium compound with the azo compound dissolved in a suitable solvent. Alternately, the precipitate may be recovered and subsequently slurried in the same or a different solvent to form a catalytically active composition. The precipitate is highly reactive and should be stored in a closed vessel under an inert atmosphere (e.g., nitrogen).

Catalyst compositions of the present invention are useful for a variety of purposes but find particular utility for the polymerization of olefins such as ethylene.

When the catalyst composition of the present invention is to be utilized as an olefin polymerization catalyst, an olefin such as a $C_2$ to $C_{20}$ olefin is added to the slurry in a reactor which is substantially completely free from deleterious impurities such as water, oxygen, carbon oxides, etc. In this situation it is generally preferable that the reaction slurry contain from about 0.01 to about 0.05 mols of insoluble reaction product per mol of solvent (preferably determined with respect to the amount of titanium in the insoluble reaction product). A wide variety of polymerization reaction conditions may be employed, including for example, temperatures in the range from about $-40°$ to 200° C. (temperatures from about 20° to 80° C. being preferred), a pressure in the range from about 1 to about 250 atmospheres (a pressure of about 1 to 10 atmospheres being preferred), and a reaction time within the range of about 0.2 to 24 hours (about 2 to 6 hours generally being satisfactory). As a result of the addition of the olefin to the catalytically active slurry, a polyolefin is formed which may be recovered from the reaction mixture at the end of the polymerization reaction by any suitable means such as filtration, distillation, etc.

The invention will be further illustrated by the following specific examples which are given by way of illustration and which are not intended as limitations on the scope of the invention.

*Example I*

Dissolve about 0.55 ml. of titanium tetrachloride in about 200 ml. of substantially completely pure n-heptane in a closed reaction vessel blanketed with nitrogen and cool the solution to a temperature of about $-10°$ C. Add about 0.6 ml. of azoethane. A yellow crystalline precipitate is immediately formed. Slowly bring the reaction mixture to room temperature. As this is done, the yellow crystalline precipitate will slowly turn in color to form a brown crystalline precipitate.

The reaction mixture formed as a result of this reaction may be used directly for a catalytic chemical conversion operation, such as an olefin polymerization operation. The precipitate may also be recovered for subsequent use as a polymerization catalyst, as shown by the following example.

*Example II*

Recover the precipitate of the reaction slurry of Example I by filtration in inert atmosphere, wash the recovered precipitate with aliquant portions of a total of about 200 ml. of n-heptane and then dry the washed precipitate under a vacuum.

Utilizing an inert atmosphere of nitrogen, slurry about 0.7 grams of the dried precipitate in 100 ml. of substantially completely pure n-heptane.

Separately heat about 700 ml. of substantially pure n-heptane to a temperature of about 55° C. in an inert atmosphere of nitrogen and then add thereto a slurry of precipitate in n-heptane. Next, bubble gaseous ethylene through the reaction mixture at atmospheric pressure and at the indicated temperature of about 55° C.

Polymer formation occurs.

*Example III*

Utilizing a closed reactor blanketed with nitrogen, dissolve about 0.55 ml. of pure titanium tetrachloride in about 200 ml. of substantially completely pure n-heptane at room temperature and, at room temperature, add thereto about 0.6 ml. of azoethane.

A sticky, viscous, substantially amorphous precipitate is immediately formed. The amorphous material in the reaction mixture, on standing, turns to a crystalline brown precipitate.

What is claimed is:

1. A method for preparing a catalytically active composition which comprises reacting a $C_1$ to $C_4$ hydrocarbon alkyl azo compound in an inert hydrocarbon solvent solution with titanium tetrachloride in the ratio of about 0.5 to 2 mols of azo compound per mol of titanium compound in an inert atmosphere to form a reaction mixture containing the solvent and a solvent insoluble reaction product of the azo compound with the titanium compound.

2. A method as in claim 1 wherein the azo compound is azoethane.

3. The solvent-insoluble reaction product prepared by the process of claim 1.

4. A method for preparing a catalytically active composition which comprises reacting titanium tetrachloride with about 0.5 to 2 mols, per mol of titanium compound, of a $C_1$ to $C_4$ hydrocarbon alkyl azo compound at a temperature of not more than about −10° C. in solution in an inert saturated aliphatic hydrocarbon solvent in an inert atmosphere to thereby obtain a reaction mixture containing the solvent and a solvent insoluble reaction product of the titanium compound with the azo compound.

5. A method for preparing a catalytically active composition which comprises reacting titanium tetrachloride with about 0.5 to 2 mols, per mol of titanium compound, of a $C_1$ to $C_4$ hydrocarbon alkyl azo compound at a temperature of not more than about −10° C. in solution in an inert hydrocarbon aliphatic hydrocarbon solvent in an inert atmosphere to thereby obtain a reaction mixture containing a solvent insoluble reaction product of the titanium compound with the azo compound, warming said reaction mixture to about room temperature whereby a brownish colored crystalline precipitate is present in said reaction mixture, and recovering said precipitate from said reaction mixture.

6. A method for preparing a catalytically active composition which comprises reacting titanium tetrachloride with about 0.5 to 2 mols, per mol of titanium compound, of a $C_1$ to $C_4$ hydrocarbon alkyl azo compound at a temperature within the range of about −80° to about −10° C. in solution in an inert saturated aliphatic hydrocarbon solvent in an inert atmosphere to thereby obtain a reaction mixture containing a solvent insoluble reaction product of the titanium compound with the azo compound, permitting said reaction mixture to stand for a period of time sufficient to provide a brownish colored crystalline precipitate and recovering said precipitate.

7. A method for polymerizing ethylene which comprises passing ethylene under polymerization conditions through a reaction medium consisting essentially of an organic solvent having slurried therein the solvent insoluble brownish crystalline reaction product prepared by the reaction of titanium tetrachloride with about 0.5 to 2 moles per mole of titanium tetrachloride of a $C_1$ to $C_4$ hydrocarbon alkyl azo compound in an inert hydrocarbon solvent under an inert atmosphere, said polymerization conditions including a temperature within the range of about −40° to about 200° C., a pressure within the range of about 1 to about 250 atmospheres and a reaction time within the range of about 0.2 to 24 hours.

8. A method which comprises the steps of reacting titanium tetrachloride with about 0.5 to 2 mols, per mol of titanium compound, of a $C_1$ to $C_4$ hydrocarbon alkyl azo compound in solution in from about 100 to 600 volumes of an inert hydrocarbon solvent per volume of titanium compound to form a solvent insoluble reaction product of the azo compound with the titanium compound, crystallizing said insoluble reaction product, recovering said crystalline reaction product, slurrying in an organic solvent an amount of said crystalline product sufficient to provide about 0.01 to about 0.05 mols of crystalline product per mol of solvent and then passing a $C_2$ to $C_{20}$ olefin through said slurry under polymerization conditions to polymerize said olefin, said polymerization conditions including a temperature within the range of about −40° to about 200° C., a pressure within the range of about 1 to about 250 atmospheres, and a reaction time within the range of about 0.2 to 24 hours.

9. A method which comprises the steps of reacting azoethane with about 1 mol of titanium tetrachloride per mol of azoethane in solution in an inert aliphatic hydrocarbon solvent at a temperature within the range of about −80° to about −10° C. to form a solvent insoluble reaction product of the titanium tetrachloride and the azoethane in said solvent, warming the thus prepared reaction mixture to room temperature to provide a brown crystalline precipitate, recovering said crystalline precipitate, slurrying said brown precipitate in about 20 to 100 mols, per mol of precipitate, of an organic solvent and passing ethylene through said thus prepared slurry under polymerization conditions to polymerize said ethylene, said polymerization conditions including a temperature within the range of about −40° to about 200° C., a pressure within the range of about 1 to about 250 atmospheres, and a reaction time within the range of about 0.2 to 24 hours.

References Cited in the file of this patent

UNITED STATES PATENTS

| 2,772,259 | Hagenmeyer | Nov. 27, 1956 |

FOREIGN PATENTS

| 533,362 | Belgium | May 16, 1955 |